Patented Nov. 6, 1934

1,979,926

UNITED STATES PATENT OFFICE 1,979,926

WATER SOFTENER

Robert E. Zinn, Chicago Heights, Ill., assignor to Victor Chemical Works, Chicago, Ill., a corporation of Illinois No Drawing. Application September 5, 1933, Serial No. 688,268

5 Claims. (Cl. 210—23)

This invention relates to an improved water softener and, more particularly, to a water softener consisting of thin flakes of alkali metal pyrophosphates or metaphosphates, with adhering alkali metal salts.

In my co-pending application, Serial No. 688,267 filed September 5, 1933, is described a process of producing thin flakes of alkali metal pyro or metaphosphates, or mixtures thereof, which consists essentially in pouring such substances in molten form between rapidly rotating rolls while partially congealing said substances, discharging the material in ribbon-like partially congealed form from the rolls, and completing congelation thereof.

Flakes so produced may be used as water softeners, and produce salts of calcium magnesium, etc., which are sufficiently soluble so as to produce no precipitate in the treated water. It is often desirable, however, to add other alkali metal salts to meta or pyrophosphates or mixtures thereof. For instance, with certain types of hard water, the pyro or metaphosphates will not reduce the hardness to zero by the soap test, but with an added alkali metal salt such as trisodium ortho phosphate, or sodium carbonate, the hardness can be readily reduced to zero without any precipitation. It has now been discovered that the flakes of phosphatic material so prepared may readily be incorporated with other alkali metal salts by powdering such salts and mixing them with the flakes. The flakes are then agitated and are sprayed with a fine mist of water in a definite amount so that no substantial solution of the flakes occurs. This is preferably carried out by using a normally hydrated alkali metal salt in anhydrous or partially anhydrous condition, and using sufficient moisture to cause adherence of the crystals, but not substantially more than is necessary to permit the salt to regain its normal hydrated form. Preferably only enough is used to partially rehydrate the salt, and the range of 40-80% of the amount required for this purpose is generally preferred.

As an example of this process, thin flakes of alkali pyro or metaphosphates or mixtures thereof, are produced having a glossy appearance, but spotted with very small crystals of the adhering salt. The salt has the appearance of being fused into the surface of the flakes.

The percentage of alkali metal salt added to the pyro or metaphosphate may be adjusted as desired, up to 50% of the resulting flake, without causing any hard water precipitate when used as a water softener in hard water.

As an example of the invention, sodium metaphosphate flakes were prepared in accordance with the process of my co-pending application, Serial No. 688,267 were placed in a mixer similar to an ordinary concrete mixer, the desired amount of trisodium phosphate mono-hydrate in powdered form was dusted into the mixer with the metaphosphate flakes, and the two were thoroughly mixed. After the mixing was complete, a fine spray of water was sprayed into the mixer. The trisodium phosphate became affixed to the flakes and took up the water as water of hydration without any appreciable solution of the flakes. In a specific instance water sufficient to produce about 8 or 9 molecules of water of crystallization was used, as against 12 required to completely rehydrate.

It is obvious that other means may be used for producing flakes of this character or to produce the permanent adherence of the added salt. For example, the flakes may be first sprayed with moisture and then dusted with a partially or wholly anhydrous salt. Likewise, a solution of the added salt dissolved in its water of crystallization may be sprayed onto the surface of the flakes and crystallized thereon when cooled. It is also possible to produce the flakes by using more than the amount of water described, but it is preferred not to do so inasmuch as the flakes may be considerably damaged. Flakes produced in this manner will not cake, are almost instantly soluble in water, are readily handled for domestic and commercial use, and the composition of the material remains uniform throughout, since there is no segregation as would be the case between a powder and a flake. The trisodium phosphate is also low in phosphate content, yet it contributes as much softening effect so that there is a saving in cost.

Alkali metal hydroxides may also be used, but it is preferred not to produce a water softener in flake form in this case, because of the deliquescent character of the hydroxides. By "dehydrated" as used in the claims of this application, is meant a substance which has been either partially or wholly dehydrated.

As set forth in my co-pending application Serial No. 688,267, filed September 5, 1933, the flakes when prepared in accordance with the process therein described have a thickness of the order of 0.001 of an inch. This may be varied within considerable limits, but in general, the flakes are less than 0.01 of an inch in thickness.

The foregoing detailed description has been given for clearness of understanding only, and no unnecessary limitations should be understood therefrom, but the appended claims should be construed as broadly as permissible, in view of the prior art.

I claim:

1. A water softener comprising a flake having a thickness of the order of .001 of an inch substantially of a compound of the class consisting of alkali metal meta and pyrophosphates and mixtures thereof, and having spotted on the surface thereof a minor proportion of crystals of a compound of the class consisting of alkali metal orthophosphates and carbonates.

2. A water softener comprising a flake having a thickness of the order of .001 of an inch substantially of alkali metal metaphosphate, and having spotted on the surface thereof a minor proportion of crystals of a compound of the class consisting of alkali metal orthophosphates and carbonates.

3. A water softener as set forth in claim 2 in which the crystals are substantially of alkali metal orthophosphate.

4. A water softener as set forth in claim 2 in which the crystals are substantially of alkali metal carbonate.

5. A water softener comprising a flake having a thickness of the order of .001 of an inch substantially of sodium metaphosphate and having spotted on the surface thereof a minor proportion of crystals of sodium carbonate.

ROBERT E. ZINN.